(12) United States Patent
Sims et al.

(10) Patent No.: US 10,220,356 B2
(45) Date of Patent: Mar. 5, 2019

(54) CHEMICAL SOLUTION FEEDER AND METHOD

(75) Inventors: Kenneth Mark Sims, Barry, TX (US); Brian Bokowy, Gainesville, FL (US); David Jack Thomas, Springfield, PA (US)

(73) Assignee: ALLCHEM PERFORMANCE PRODUCTS, LP, Gainesville, FL (US)

(*) Notice: Subject to any disclaimer, the term of this patent is extended or adjusted under 35 U.S.C. 154(b) by 1601 days.

(21) Appl. No.: 12/247,709

(22) Filed: Oct. 8, 2008

(65) Prior Publication Data

US 2010/0086445 A1    Apr. 8, 2010

(51) Int. Cl.
| | | |
|---|---|---|
| *B01F 1/00* | (2006.01) | |
| *B01F 15/00* | (2006.01) | |
| *C02F 1/68* | (2006.01) | |
| *C02F 1/00* | (2006.01) | |
| *C02F 1/76* | (2006.01) | |

(52) U.S. Cl.
CPC .......... *B01F 1/0027* (2013.01); *B01F 1/0038* (2013.01); *B01F 15/00149* (2013.01); *B01F 15/00155* (2013.01); *B01F 15/00253* (2013.01); *C02F 1/688* (2013.01); *C02F 1/008* (2013.01); *C02F 1/76* (2013.01); *C02F 2209/40* (2013.01); *C02F 2209/42* (2013.01); *C02F 2303/04* (2013.01)

(58) Field of Classification Search
CPC .......... B01F 1/00; B01F 1/0027; B01F 1/0038
USPC .................... 422/106, 114, 115, 263; 134/93; 137/268
See application file for complete search history.

(56) References Cited

U.S. PATENT DOCUMENTS

| | | | | |
|---|---|---|---|---|
| 2,738,323 | A * | 3/1956 | Tepas, Jr. ...................... | 422/274 |
| 3,574,561 | A * | 4/1971 | Nickerson et al. ........... | 422/106 |
| 4,020,865 | A * | 5/1977 | Moffat et al. ................. | 137/268 |
| 6,531,056 | B2 * | 3/2003 | Hammonds .................... | 210/87 |
| 2005/0129596 | A1 * | 6/2005 | Barani .......................... | 422/264 |

* cited by examiner

*Primary Examiner* — Sean E Conley
(74) *Attorney, Agent, or Firm* — Baker & Hostetler LLP

(57) ABSTRACT

A feeder is disclosed for dissolving a chemical and mixing it with a liquid. The feeder includes a hopper adapted to hold the chemical, a nozzle located in the hopper, and a supply of the liquid to the nozzle to dissolve the chemical on contact with the liquid from the nozzle to form a solution. A solution basin is disposed under the hopper and a drain is provided from the hopper into the solution basin. An outlet from the solution basin has an outlet valve which opens when a solution level in the solution basin rises.

33 Claims, 9 Drawing Sheets

CHEMICAL SOLUTION FEEDER AND METHOD

FIELD OF THE INVENTION

Several embodiments of the invention pertain to the field of chemical solution feeding devices and methods. More particularly, some aspects pertain to feeders that dissolve solid chemical material, using a liquid, to create a solution and feed the solution to systems such as, for example, drinking water systems.

BACKGROUND OF THE INVENTION

Feeder systems for chemical solutions are in wide use in industry. For example, one application for a chemical solution feeder is a system that will dissolve chemicals into water to create a solution that can be fed to an environment such as a drinking water delivery device. Further, it is known to provide chemical solution feeders which will dissolve solid materials such as, for example, trichloroisocyanurate, calcium hypochlorite, and other chemicals, which are in tablet or pellet form. In one example, tablets are dissolved by being contacted by a stream of water directed at the tablets, or above the tablets such that the water falls on the tablets in a hopper. This creates a liquid solution which can be drawn from the hopper and fed into a drinking water delivery system.

The known chemical feeders have been quite satisfactory. However, it is always desirable to provide systems which may be more efficient, and/or which may provide better flow regulation of the solution supply.

SUMMARY OF THE INVENTION

An embodiment of the present invention discloses a feeder for dissolving a chemical and mixing it with a liquid, that includes a hopper adapted to hold the chemical, a nozzle located in the hopper, a supply of the liquid to the nozzle to dissolve the chemical on contact with the liquid from the nozzle to form a solution in a solution basin, a diversion plate to extend the contact time between the water and the chemical to form the solution, with a drain from the hopper into the solution basin, and an outlet from the solution basin having an outlet valve which opens when a solution level in the solution basin rises.

Another embodiment includes a drinking water chlorinating system, with a feeder for dissolving a chemical and mixing it with a liquid. In addition, the present invention describes a hopper adapted to hold the chemical, a nozzle located in the hopper, a supply of the liquid to the nozzle to dissolve the chemical on contact with the liquid from the nozzle to form a solution in a solution basin, a diversion plate to extend the contact time between the water and the chemical to form the solution, with a drain from the hopper into the solution basin, and an outlet from the solution basin having an outlet valve which opens when a solution level in the solution basin rises. A pump feeds water from a water source to the feeder and the solution is sent from the feeder to a storage tank.

Yet another embodiment of the present invention discloses a feeder for providing a dissolved chemical with a tank adapter to contain the dissolved chemicals, a diversion plate to extend the contact time between the water and the chemical to form the solution, a solution basin with a drain from the tank into the solution basin, and an outlet from the solution basin having an outlet valve which opens when a solution level in the solution basin rises.

A feeder for dissolving a chemical and mixing it with a liquid is also disclosed which comprises means for dissolving the chemical into the liquid to form a solution, a diversion plate for extending contact time between the chemical and a liquid, a solution basin for receiving the dissolved solution, an outlet from the solution basin having means for controlling the rate of solution outlet based on the solution level in the solution basin.

A further embodiment includes extending contact time between the chemical and a liquid. Dissolving a chemical and mixing it with a liquid to form a dissolved solution in a solution basin. The dissolved solution is outputted from the solution basin and the rate of solution outlet is controlled based on the solution level in the solution basin.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
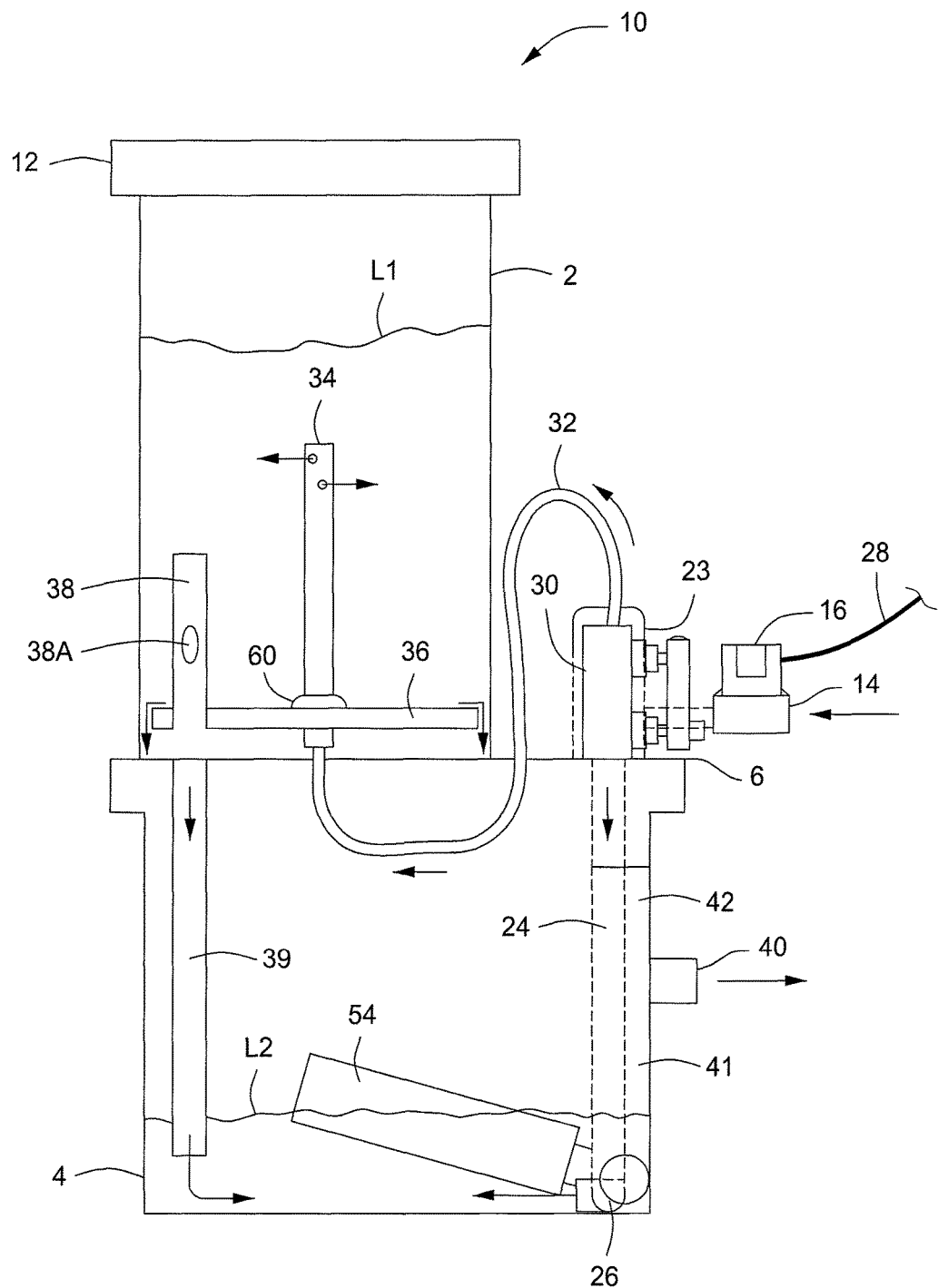
FIG. 1 is a side view of a chemical solution feeder according to a preferred embodiment of the invention.
Figure 2:
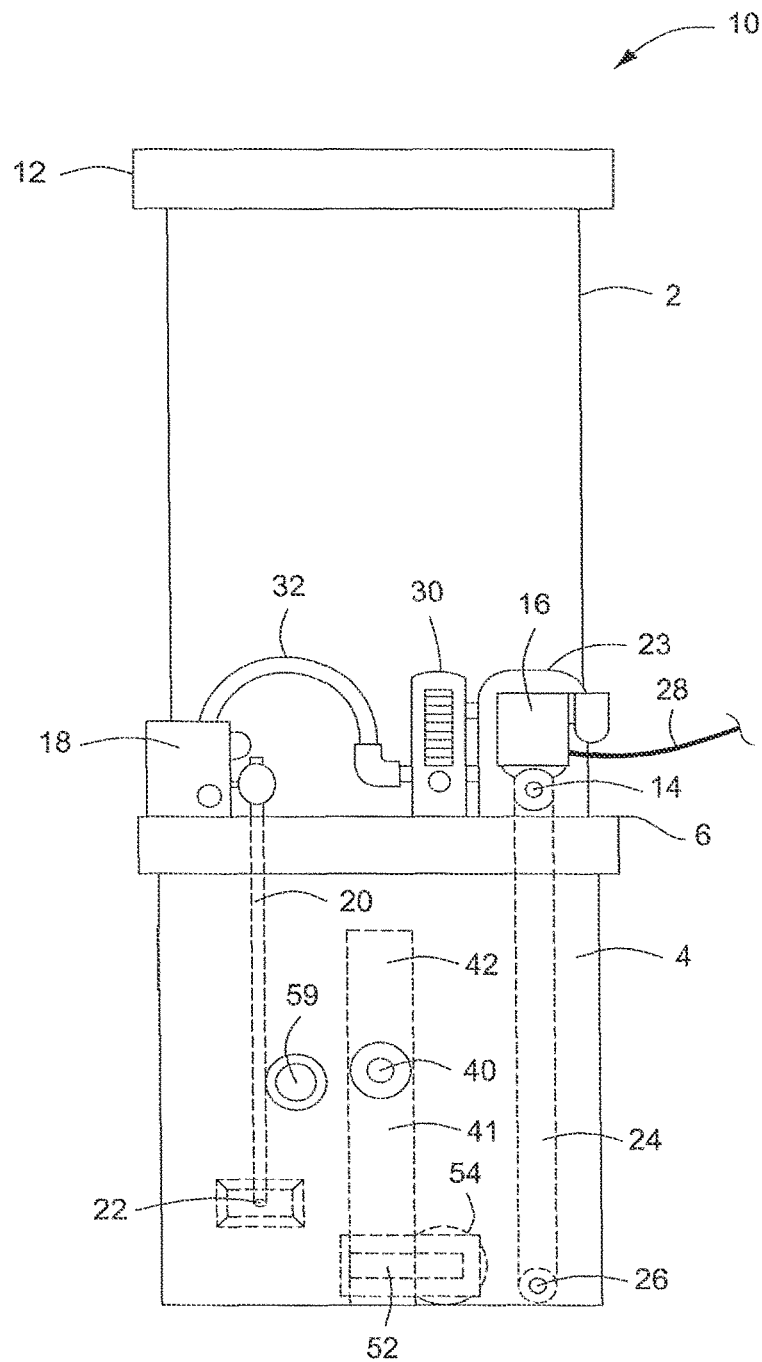
FIG. 2 is a front view of the chemical solution feeder of FIG. 1.

Referring initially to FIGS. 1 and 2, a chemical solution feeder 10 is illustrated. The feeder 10 will now be further described along with other embodiments, with reference made to the drawing figures, in which like reference numerals refer to like parts throughout.

Reference will now be made especially to FIGS. 1-4, taken together, since some components are feasible to show only in some of these views. The feeder 10 includes an upper cylinder hopper 2, also referred to as a tablet hopper, which is a container that holds solid chemical tablets and receives water to dissolve the tablets, as is described in more detail below. The tablet hopper 2 is comprised of any three-dimensional shape with a hollow interior volume. The interior volume of the tablet hopper 2 is characterized by an interior dimension that spans the width of the interior volume. The tablet hopper 2 rests upon a lower basin or tank, also referred to as a solution mixing basin 4. An intermediate top plate 6 separates the tablet hopper 2 above the solution mixing basin 4, and also supports other valves, switches, solenoids, and/or other components as seen in the drawings and as described further below.

Water from sources available for use by people is often contaminated by organisms which may cause harm to humans who come in contact with them. When water is extracted from these sources for use by people, it is desired to chemically treat this water to rid it of harmful organisms. Such treatment of the water promotes health in communities which tap a contaminated water source by preventing the spread of disease and illness caused by use of non-treated water.

The feeder 10 receives water from a water inlet/supply line 14. In some installations, this may be well water, or alternatively it may be some other naturally occurring or manmade water source. A purpose of receiving this inlet water is to use at least part of it to dissolve chemical tablets, such as, for example, trichloroisocyanurate or calcium hypochlorite tablets, to produce a chlorinated and otherwise chemically treated water solution that can be supplied to the drinking water system.

The inlet water from the inlet supply 14 is directed to an inlet water solenoid valve 16. The inlet water supply solenoid 16 operates in a normally closed position. The water supply solenoid 16 can be opened to allow water to flow to the feeder 10 when a signal is sent from pump 114 (shown in FIG. 6) when operational via line 28. The water supply solenoid 16 can be closed to provide a safety cutoff when it is detected that malfunction, or overly high levels, or overflow of the system is occurring. During normal operation the inlet water supply solenoid 16 is open and permits the inlet water to feed through it. A solution level switch 18 is provided inside the solution mixing basin 4 utilizing a float arm 20 and a float 22. When the water/solution level L2 in the solution basin 4 becomes too high, the float 22 rises and the solution level switch 18 is triggered and sends a signal via a signal line 19 to the inlet water supply solenoid 16 to reduce or close the supply of inlet supply water. Main power is supplied to the solution level switch 18 via a power cable 21.

Water fed through the inlet water supply solenoid 16 can be directed out from the inlet water supply solenoid 16 in two paths. At all times, any inlet water from the inlet water supply solenoid 16 is available to travel in a first path down a rinse down pipe 24 to a rinse nozzle jet 26 located in the bottom of the solution tank 4. Also, a portion of the inlet water from the inlet water supply solenoid 16 can be selectively directed in a second path to a chemical feed flow-meter 30. The chemical flow-meter 30 serves to both provide an indication of the amount of water passing through it, and to adjustably regulate the flow rate of the water through it. If the chemical feed flow-meter 30 is closed, the inlet supply water only takes the first path, and therefore exits the rinse nozzle jet 26, filling up the solution tank 4. However, if the chemical feed flow-meter 30 is open, a portion of the inlet water is fed via tube 32 which receives water from the chemical feed flow-meter 30 and directs it to a mining nozzle 34. The chemical feed flow-meter 30 can gradually adjust the portion of the water which goes to the mining nozzle 34, or can be designed to allow only a fixed portion of water to the mining nozzle 34. A dome 23 covers a T-shaped splitter that splits water fed out of the inlet water supply solenoid 16.

The chemical feed flow-meter 30 when open thus allows a portion of the inlet water to travel through a tube 32 to the mining nozzle 34. In one embodiment the chemical feed flow-meter 30 is controlled manually. The chemical feed flow-meter 30 is manually set to allow a predetermined portion of the inlet water to pass through it thus providing a constant flow rate when water is being pumped to the chemical feeder 10.

Figure 4:
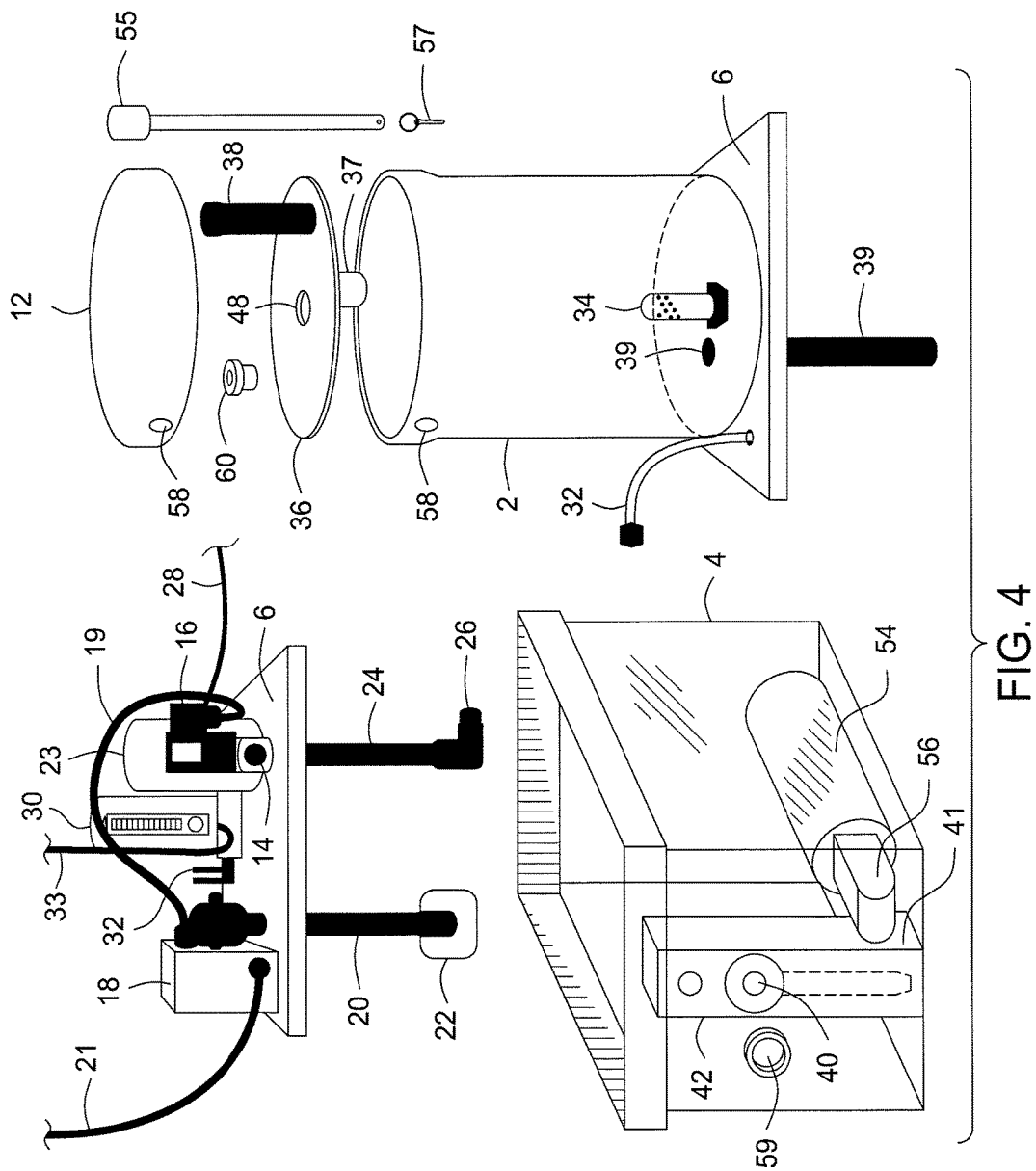
FIG. 4 is an exploded view of various components of the feeder of FIG. 1.
Figure 5:
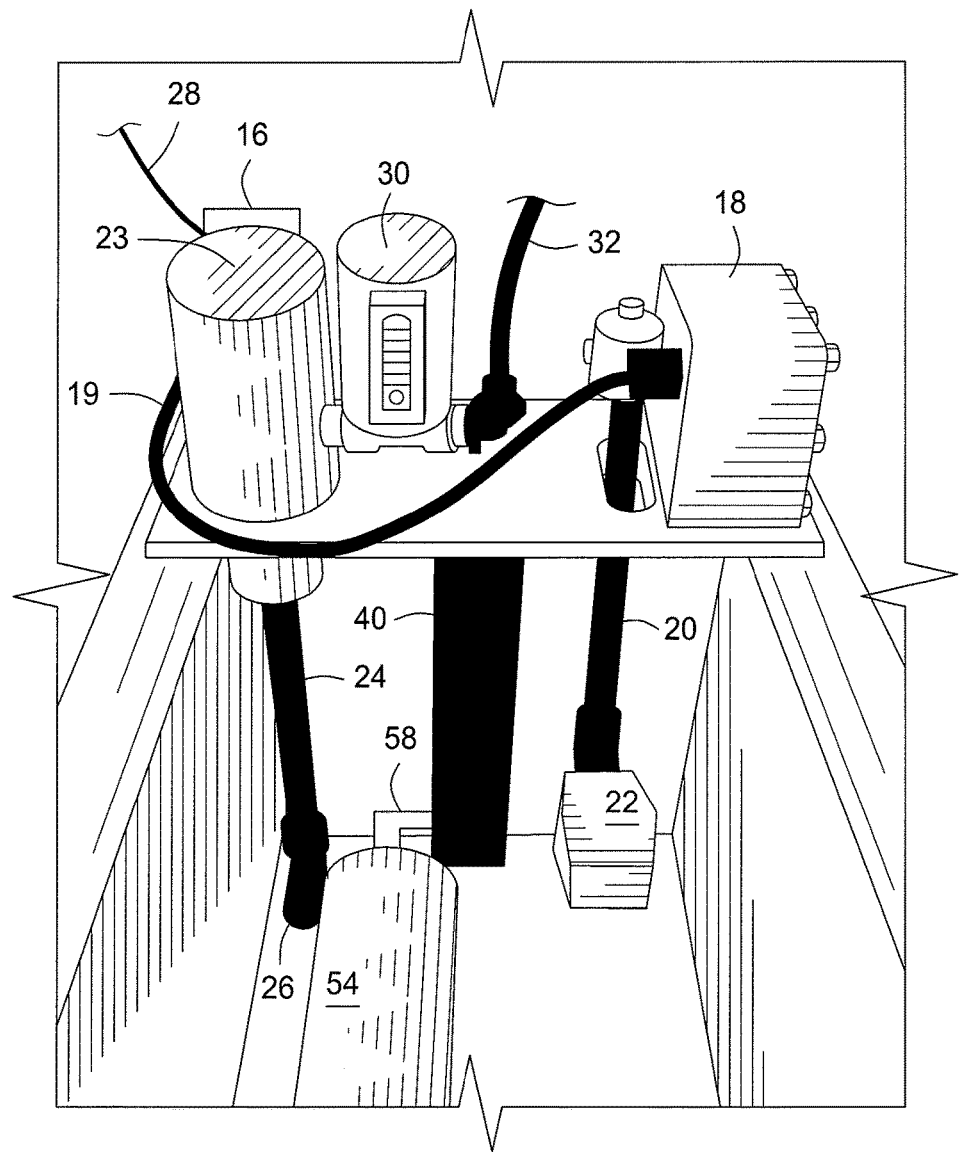
FIG. 5 is a perspective view showing some components of the feeder of FIG. 1.

In another embodiment the chemical feed flow-meter is controlled automatically by an external electric or electronic switch or controller via a control line 33 (shown in FIG. 4). In some cases, the chemical feed (supply to the nozzle) is performed intermittently based on a pre-set schedule or by measured chemical levels. The pre-set measured chemical levels adjust the chemical feed flow-meter 30. In the case of a drinking water system application, the chemical feed may include a chlorine addition function and be performed based on a pre-set schedule and/or measured chlorine levels.

It will be appreciated that when the chemical feed flow-meter 30 is closed, then the feeder 10 essentially receives the inlet water which is all ejected out the rinse nozzle jet 26. However, for example, when it is desired to add chemicals to drinking water by creating a chemical solution, the chemical feed flow-meter 30 will be opened manually or by a signal from the control line 33 (shown in FIG. 4). Water will be supplied through the conduit line 32 to the mining nozzle 34.

As shown in FIG. 2 the chemical feed flow-meter 30 is disposed to the left of water supply solenoid 16. In other embodiments, the chemical feed flow-meter 30 and the water supply solenoid 16 can be disposed in any manner in relation to each other, such as the chemical feed flow-meter 30 disposed to the right of water supply solenoid 16.

Assuming that the tablet hopper 2 has been filled with tablets, for example to a level shown at L1, then water that is ejected horizontally through holes in the mining nozzle 34 will impact and dissolve the tablets to form a solution in the lower part of the tablet hopper 2. This solution will flow over the edges of a diversion plate 36 and collect at the bottom of the tablet hopper 2, where it will drain out a solution supply drain pipe 39 and into the solution basin 4. The diversion plate 36 is a flat solid disc with a width slightly less than the inner dimension of the tablet hopper 2, creating a gap 62 between the edge of the diversion plate 36 and the tablet hopper 2 to allow the solution to flow downward. The diversion plate 36 is solid such that the solution created in tablet hopper 2 does not permeate the diversion plate 36 and is urged to flow over the edges of the diversion plate 36. The non-permeable nature of the diversion plate 36 creates a longer path for the water to travel thus extending the contact time between the water and the chemical, such as trichloroisocyanurate tablets. The diversion plate 36 may alternatively be domed to facilitate the solution migration towards the edge of the diversion plate 36. Another alternative conceives that the diversion plate has a plurality of holes in it that serves as a strainer. The mining nozzle 34 extends through a hole 48 in the diversion plate 36. In some embodiments a flange 60 provides a seal between the hole 48 and the diversion plate 36. Spacers 37 space the diversion plate 36 above the bottom of the tablet hopper 2. Because the solution basin 4 is also receiving rinse water from the rinse nozzle 26, the liquid in the solution basin 4 forms a buffer that dilutes the solution from drain pipe 29. The solution from the drain pipe 39 can be fairly highly concentrated.

It will be apparent that the diversion plate 36 functions as a baffle to extend the flow path from the mining nozzle 34 to the drain pipe 39.

Figure 9:
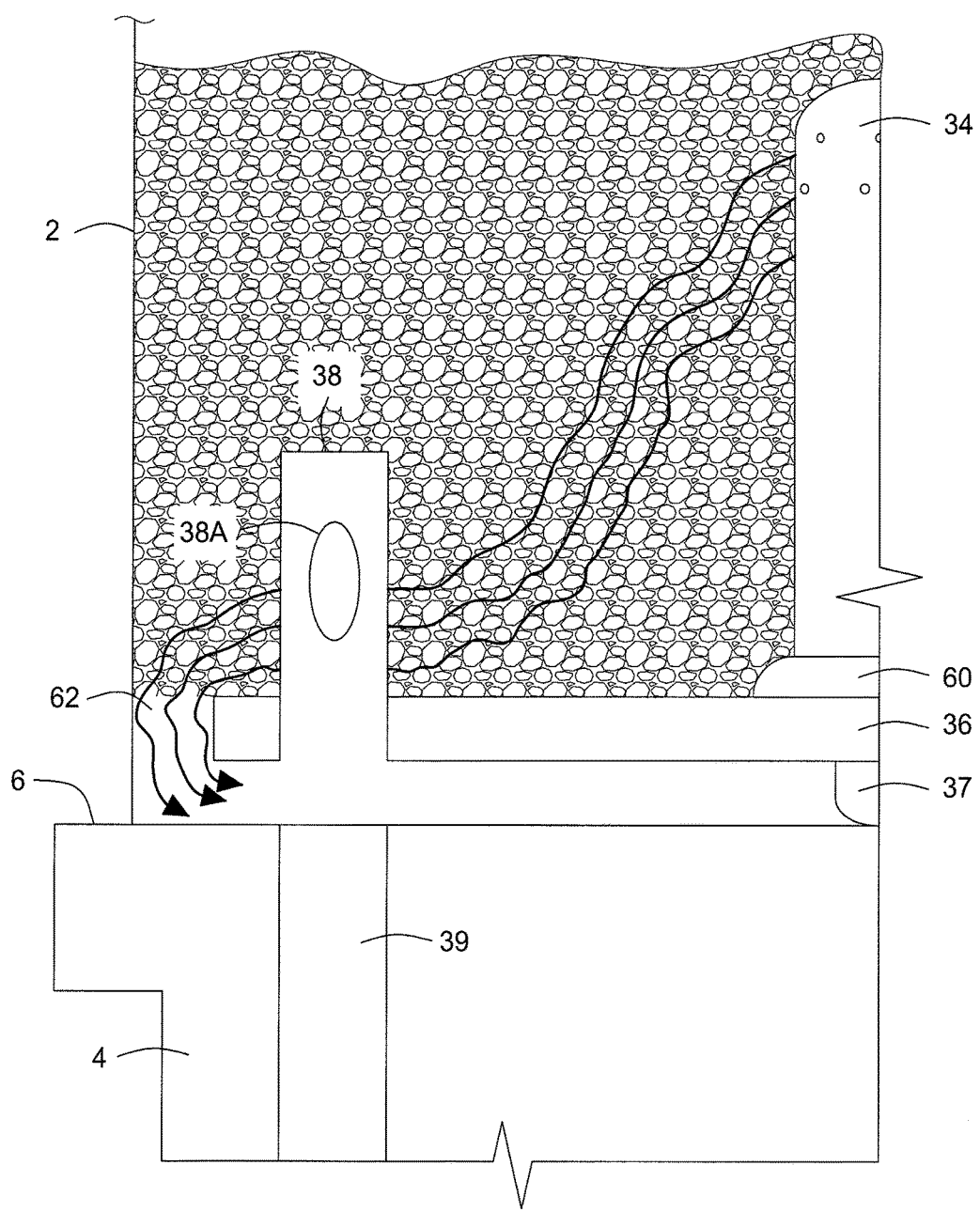
FIG. 9 is a close-up view of the downward flow path of the solution past the diversion plate.

As shown in FIG. 9 the water emanating from the mining nozzle 34 has a downward flow path. The mining nozzle 34 first ejects the water into the tablet hopper 2. The water seeps downward between the chemical tablets dissolving them along the way creating a solution. The solution then contacts the diversion plate 36 which urges the solution to travel toward the edge of the diversion plate 36. The solution flows over the edge of the diversion plate 36 traveling down the gap 62 existing between the edge of diversion plate 36 and tablet hopper 2. Below the diversion plate 36, the solution migrates down drain pipe 39 and into mixing basin 4.

In case the downward flow path of the solution past the diversion plate 36 should become clogged, a hopper overflow pipe 38 is provided. The hopper overflow pipe 38 can be a vertical pipe with an opening 38A near its bottom so that, as the liquid level rises beyond a desired level then liquid will bypass the diversion plate 36 by flowing into the hopper overflow pipe 38. This hopper overflow water will be directed by the hopper overflow pipe 38 through and under the diversion plate 36 and still enter the solution supply drain pipe 39. The overflow opening 38A thus prevents water from building up in the tablet hopper 2, and minimizes submerging of the tablets in water.

From the above it will be clear that the feeder 10 can operate in one mode where water arriving at the water inlet is simply circulated straight down into the solution mixing basin 4 via the rinse nozzle jet 26, and another mode where some of the water is diverted to the mining nozzle 34 and will dissolve the chemical tablets to provide a relatively concentrated solution that enters the solution mixing basin 4 via the solution supply pipe 39. The relatively concentrated solution is diluted by mixing with rinse water from the rinse nozzle 26. As the relatively concentrated solution may still have some particulate material in suspension, it is desirable that the rinse nozzle 26 jet be located or oriented as shown, with a lateral output near the bottom of the solution mixing tank 4, so that the jet output will provide some turbulence and mixing action in the overall solution that is present in the solution mixing tank 4. The provision of a laterally terminating rinse nozzle jet 26 can thus prevent the buildup of sediment over time in the bottom of the solution mixing basin 4.

From the above it will also be seen that the solution mixing basin 4 during operation will generally be full to some extent with a solution, which is either primarily simply inlet water, or which may be inlet water that is being mixed therein with a concentrated solution (when the chemical feed flow-meter 30 is open).

Figure 3:
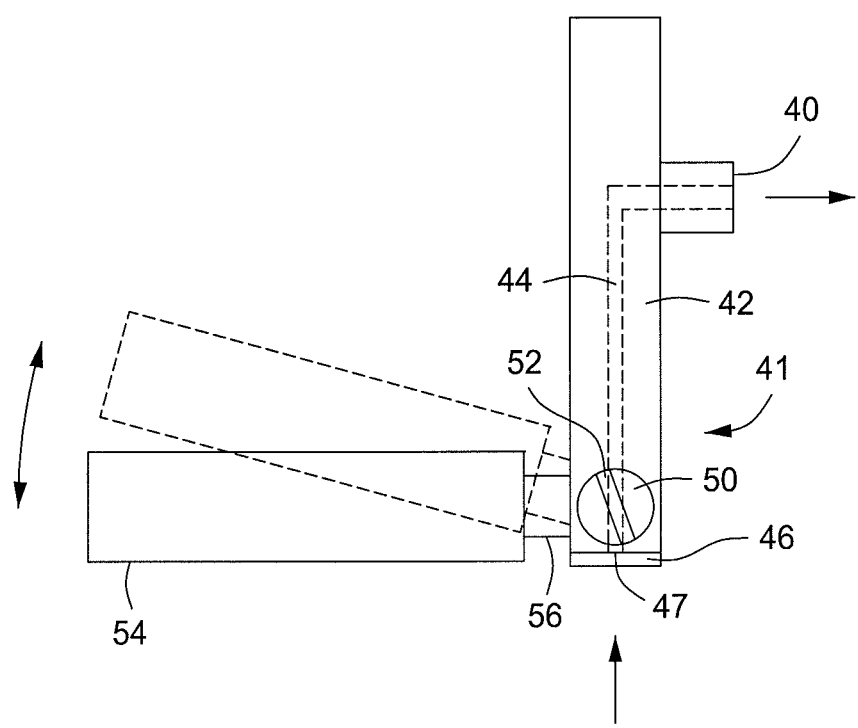
FIG. 3 is a detailed schematic view of a solution outlet float valve used in the arrangement of FIG. 1.

This liquid solution in the solution mixing basin 4 is drawn out from the solution mixing basin 4 via a solution outlet 40. The solution outlet 40 is connected to some form of low pressure inducing device, such as a venturi, that will draw the solution out of the solution mixing basin 4. In an illustrated example, an outlet control valve 41 is provided. In particular, as illustrated in FIG. 3, the control valve solution outlet 41 is provided via a valve body 42 that has an internal port 44 therethrough. The valve body 42 also has an end 46 leading to an inlet port 47, by which fluid can be drawn from the tank up into the internal port 44.

The valve body 42 operates in combination with a valve proportioning hinge pin 50, which is a rotatable cylinder having its own port 52 extending therethrough. The valve proportioning hinge pin 50 is rotated with respect to the valve body 42 by being attached to a float 54 by an arm 56. As can be seen, for example, in FIG. 3, when the float 54 is relatively lower towards the bottom of the solution mixing tank 4, the outlet control valve 41 will be in a fully or nearly fully closed position and in this position, the removal of solution via the solution outlet 40 is inhibited or prevented so that the solution mixing basin 4 will tend to fill up. In some embodiments, even if the float reaches its lowest position the valve 41 will be nearly, but not fully, closed. As the solution level rises, the float 54 moves upward, thereby opening the outlet control valve 41 more fully so that the solution outlet 40 can draw the solution out at a higher flow rate. If the rate of input into the solution mixing basin 4 is exceeding the rate of output via the solution outlet 40, the solution level will tend to rise, thereby opening the outlet control valve 41 even more fully. Therefore, in a range of normal flow conditions, the outlet control valve 41 will tend to equalize the outlet flow to preserve a relatively consistent solution level L2 in the solution mixing basin 4. In this way, the outlet valve system 41 provides at least some degree of equalization which can maintain a relatively constant level L2 in the solution tank 4, even if the flow output demand 40 varies to some degree.

In case the solution outlet 40 becomes clogged, or the solution outlet control valve 41 is otherwise not operable, an overflow port 59 is provided in the side of the solution mixing basin 4, which can be connected to a drain or sewer or the like. Also, turning to FIG. 4, it will be appreciated that a lid 12 can be secured onto the hopper 2 by a lock pin 55 and a lock ring 57 engaging various securing holes 58.

The above described system and other embodiments of the system can thus be used to receive inlet water (or another liquid) to dissolve a chemical material using at least part of the received liquid, and return a solution including the dissolved chemical into the feeder. This can have many industrial applications.

Figure 6:
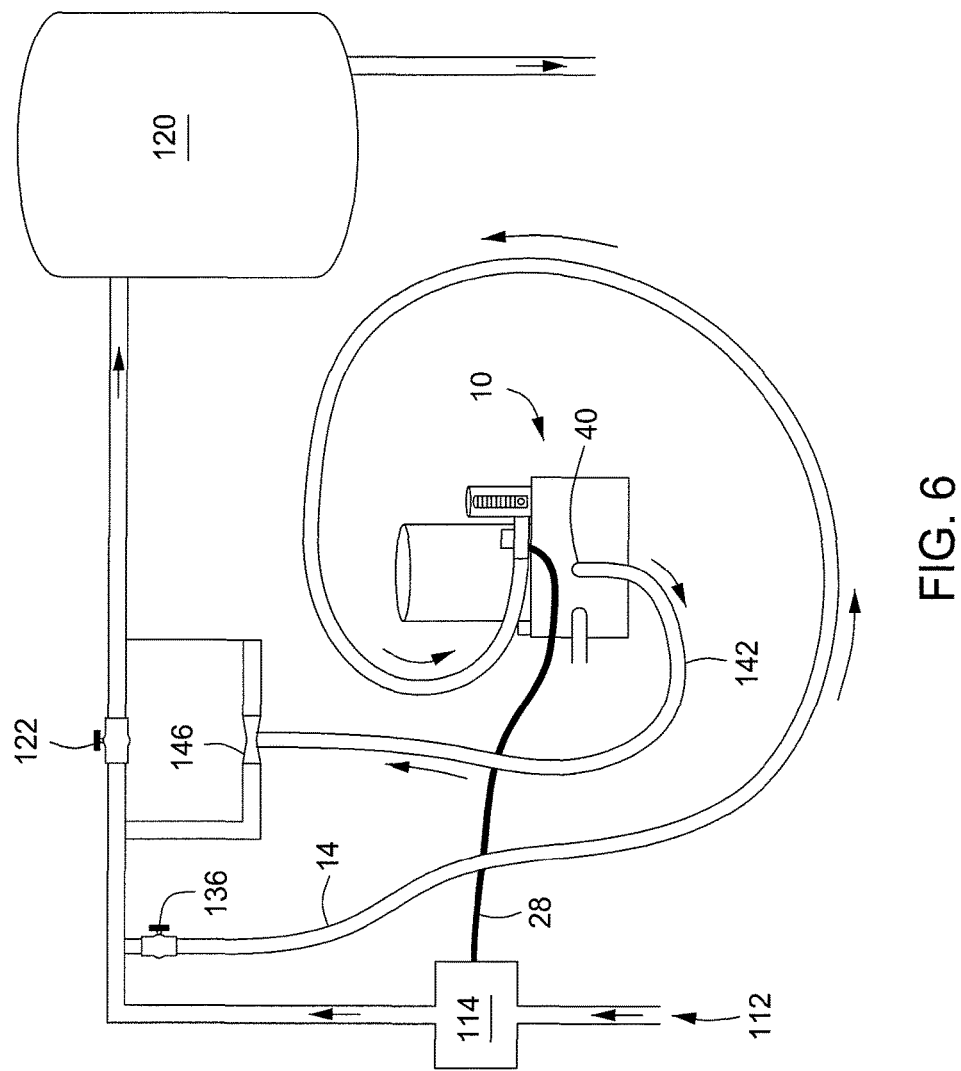
FIG. 6 is a diagrammatic view of the system of FIG. 1 installed in a drinking water handling system.

One example of an industrial application used in this specification is shown in FIG. 6, in the context of installing the feeder 10 in connection with a drinking water system. This system receives a water flow 112 from a well or other water source, and pumps it using a pump 114. When the isolation valve 122 is open, some of the water from the pump 114 will pass to a storage tank 120. When the flow control valve 136 is open, the water is fed to an inlet line 14 to the feeder system 10. This water will pass through the feeder, as described above, and will be outlet as a solution at the outlet 40 and be drawn through a tube 142 by low pressure created at a venturi 146. From there it will be directed to a storage tank 120.

Another example of a use for some feeders according to some various preferred embodiments is for domestic water, agricultural water, commercial water, industrial water, or wastewater applications. One example of a chemical for use with the feeder in drinking water and wastewater applications is the chemical trichloroisocyanurate.

Various preferred embodiments of the invention are described above. References above to water are intended to encompass not only clean water, but also water that may be treated, thereby already having some chemicals in it, or any liquid. Further, references to chemical material and to tablets in the description of the specification are also intended to be used generically, with respect to some embodiments of the invention, in that the chemical being dissolved into the water may be in a solid or partially solid-state, but could also be in liquid form. Therefore, while some embodiments utilize a nozzle that directs water onto solid pellets, it will be appreciated that other mixing of materials may occur, within the scope of some embodiments of the invention, including for example, applying the water to a cake, powder, gel, or any other chemical material that is intended to be put into solution. Also, references to tablets of some embodiments are not intended to be limiting, but can also include briquettes, powders, cakes and other chemical forms. Further, additional optional features may be added to the feeder 10 described above to provide additional functionality, while still being within the scope of at least some embodiments of the invention.

Figure 7:
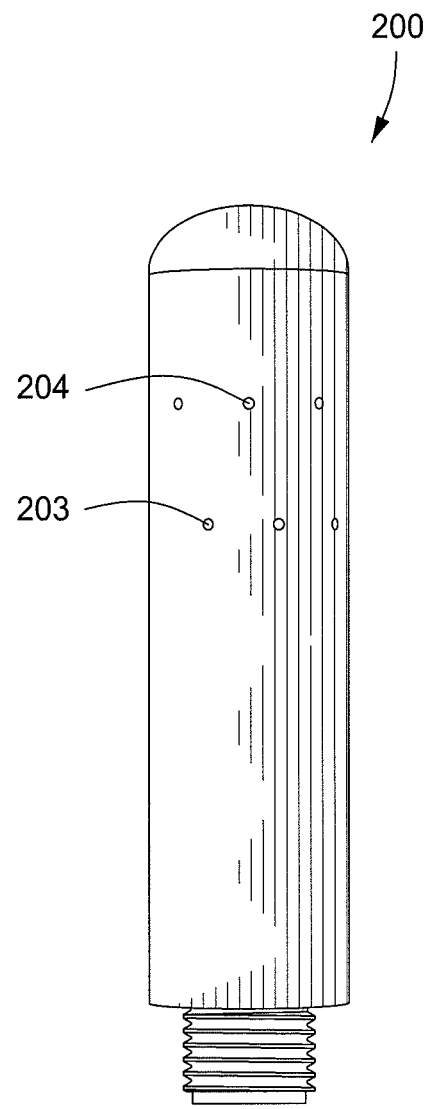
FIG. 7 is a side view of a mining nozzle.
Figure 8:
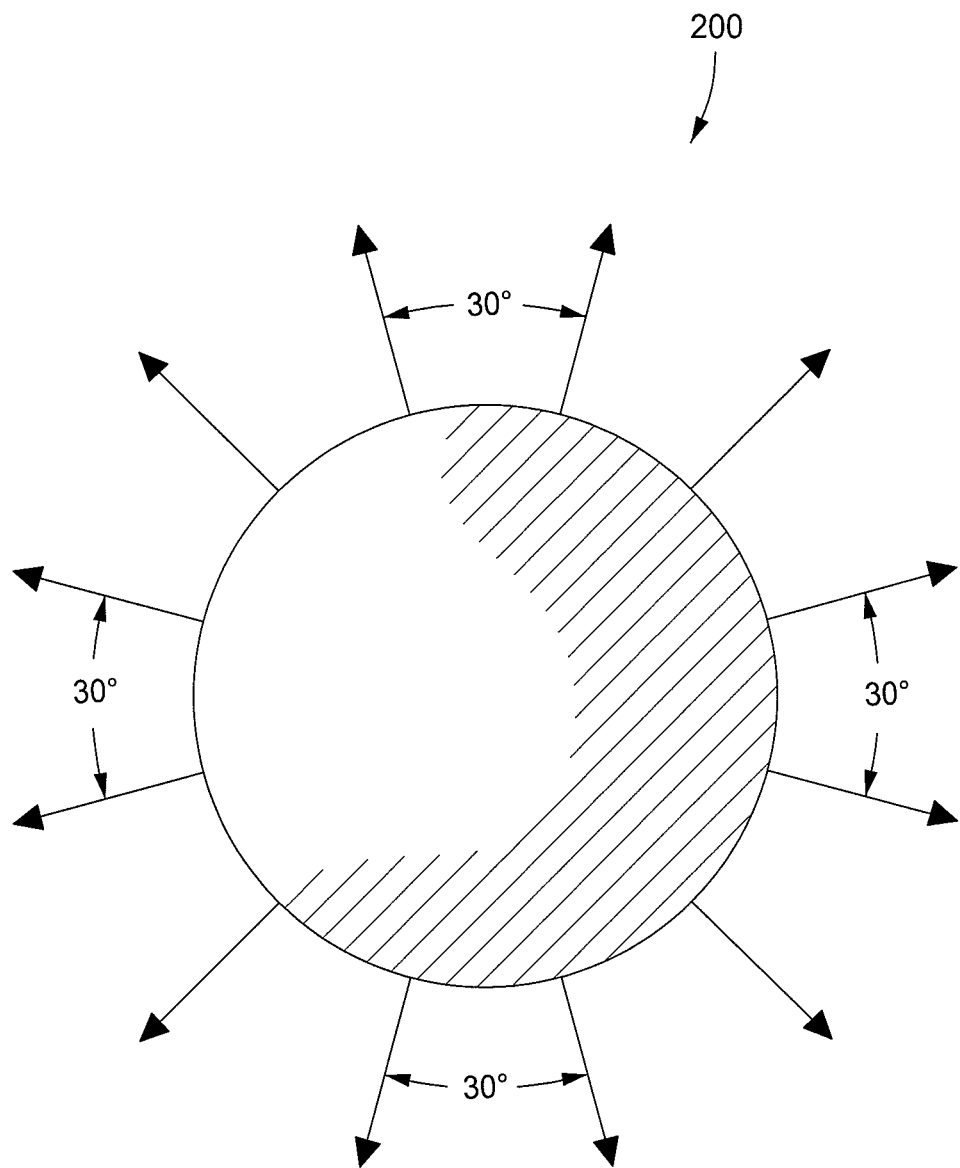
FIG. 8 is a diagram showing a spray pattern of the mining nozzle of FIG. 7.

The exemplary nozzle 34 is an upwardly projecting substantially cylindrical structure, having a plurality of individual nozzle jet ports therein. In one preferred embodiment seen in FIGS. 7 and 8, there are twelve jets total. The jet ports are in two vertical rows 203 and 204, the top row spaced above the lower row, and there are six of them spaced circumferentially around the nozzle in each row. The top row is offset 30° compared to the row beneath, so that a radial jet pattern (see FIG. 8) is provided including circumferentially spaced outward radial jets, each projecting outward from the center, with each of these radial jets spaced above each other in horizontal rows by vertical spacing. The circumferential position of the jets provides a jet at each 30° interval. Fluid sprayed from these jets tends to consume the tablets of material. Also, it will be appreciated that in the illustrated preferred embodiments, the nozzle extends upward a height that is only a portion of the height of the entire tablet hopper. Since the spray pattern described above is essentially in the horizontal direction when taken as a whole, the benefit of this arrangement is that a lower portion of the tablets can be dissolved without wetting the upper section of the tablets in the top of the hopper. As the tablets are dissolved, the overall height level of the tablets will decrease. Further, the vertical placement of the nozzle jet ports on nozzle 34 allows for water delivery in a direct stream to the tablets in line with the nozzle jet ports, and prolonged water contact with the tables sitting below the nozzle jet ports from the water that flows downward after the impact with the higher tablets.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A feeder for dissolving a chemical and mixing it with a liquid, comprising:
   a cylinder hopper with a bottom and an interior dimension, adapted to hold the chemical; a nozzle located in the hopper;
   a supply of the liquid consisting of water to the nozzle to dissolve the chemical on contact with the liquid from the nozzle to form a solution;
   a diversion plate spaced above the bottom of the cylinder hopper, having a width less than the internal dimension of the cylinder hopper to form a gap between the diversion plate and the cylinder hopper;
   a solution basin having a bottom;
   a rinse nozzle disposed at the bottom to direct a portion of the supply of the liquid horizontally across the bottom;
   a switch that shuts off the supply of liquid;
   a first float disposed in the solution basin that activates the switch to shut off the supply of liquid when the level in the solution basin exceeds a predetermined level;
   a drain from the hopper into the solution basin;
   an outlet from the solution basin disposed relatively above a solution level in the solution basin and the outlet having an outlet valve which opens when the solution level in the solution basin rises and moves toward a closed position when the solution level in the solution basin lowers, wherein the valve does not fully close and a suction continually draws the solution up from the outlet valve and out the outlet and wherein an outflow volume varies in response to the position of the outlet valve; and
   a second float disposed in the solution basin configured to activate the outlet valve and open the outlet valve as the level in the solution basin rises.

2. A feeder according to claim 1, further comprising a flow divider that diverts some of the supply liquid directly to the solution basin, and the remaining supply liquid to the nozzle.

3. A feeder according to claim 2, further comprising a flow-meter that selectively controls flow to the nozzle.

4. A feeder according to claim 1, wherein the outlet valve has an internal valve member relative to a valve body.

5. The feeder of claim 1, wherein the chemical is in tablet form.

6. The feeder of claim 1, wherein the chemical includes trichloroisocyanurate.

7. The feeder of claim 1, wherein the diversion plate further comprises a non-perforated disc.

8. The feeder of claim 7, wherein the diversion plate further comprises an aperture disposed around the nozzle.

9. The feeder of claim 8, further comprising a flange sealably disposed between the diversion plate and the nozzle preventing the solution from flowing through the aperture.

10. The feeder of claim 1, further comprising a plurality of spacers disposed between the cylinder hopper bottom and the diversion plate.

11. The feeder of claim 1, wherein the diversion plate provides for a lengthened downward flow path of the solution past the diversion plate and extended contact between the chemical and the liquid.

12. A drinking water chlorinating system, comprising:
   a suction device; and
   a feeder for dissolving a chemical and mixing it with a liquid consisting of water, the feeder further comprising:
      a cylinder hopper with a bottom and an interior dimension, adapted to hold the chemical;
      a nozzle located in the hopper;
      a supply of the liquid to the nozzle to dissolve the chemical on contact with the liquid from the nozzle to form a solution;
      a diversion plate spaced above the bottom of the cylinder hopper, having a width less than the internal dimension of the cylinder hopper to form a gap between the diversion plate and the cylinder hopper;
      a solution basin having a bottom;

a rinse nozzle disposed at the bottom to direct a portion of the supply of the liquid horizontally across the bottom;
a switch that shuts off the supply of liquid;
a first float disposed in the solution basin that activates the switch to shut off the supply of liquid when the level in the solution basin exceeds a predetermined level;
a drain from the hopper into the solution basin;
an outlet from the solution basin disposed relatively above a solution level in the solution basin and the outlet having an outlet valve which opens when the solution level in the solution basin rises and moves toward a closed position when the solution level in the solution basin lowers, wherein the valve does not fully close and the suction device continually draws the solution up from the outlet valve and out the outlet and wherein an outflow volume varies in response to the position of the outlet valve; and
a second float disposed in the solution basin configured to activate the outlet valve and open the outlet valve as the level in the solution basin rises.

13. A system according to claim 12, further comprising a flow divider that diverts some of the supply liquid directly to the solution basin, and the remaining supply liquid to the nozzle.

14. A system according to claim 13, further comprising a flow-meter that selectively controls flow to the nozzle.

15. The system of claim 12, wherein the chemical is in tablet form.

16. The system of claim 12, wherein the chemical includes trichloroisocyanurate.

17. The feeder of claim 12, wherein the diversion plate further comprises a non-perforated disc.

18. The feeder of claim 17, wherein the diversion plate further comprises an aperture disposed around the nozzle.

19. The feeder of claim 18, further comprising a flange sealably disposed between the diversion plate and the nozzle preventing the solution from flowing through the aperture.

20. The system of claim 12, further comprising a plurality of spacers disposed between the cylinder hopper bottom and the diversion plate.

21. The feeder of claim 12, wherein the diversion plate provides for a lengthened downward flow path of the solution past the diversion plate and extended contact between the chemical and the liquid.

22. A feeder for providing a dissolved chemical, comprising:
a tank adapted to contain dissolved chemicals;
a diversion plate disposed within the tank;
a solution basin having a bottom;
a rinse nozzle disposed at the bottom to direct a portion of the supply of the liquid consisting of water horizontally across the bottom;
a switch that shuts off the supply of liquid;
a first float disposed in the solution basin that activates the switch to shut off the supply of liquid when the level in the solution basin exceeds a predetermined level;
a drain from the tank into the solution basin;
an outlet from the solution basin disposed relatively above a solution level in the solution basin and the outlet having an outlet valve which opens when the solution level in the solution basin rises and moves toward a closed position when the solution level in the solution basin lowers, wherein the valve does not fully close and a suction continually draws the solution up from the outlet valve and out the outlet and wherein an outflow volume varies in response to the position of the outlet valve; and
a second float disposed in the solution basin configured to activate the outlet valve and open the outlet valve as the level in the solution basin rises.

23. A feeder according to claim 22, further comprising a flow divider that diverts some of the supply liquid directly to the solution basin, and the remaining supply liquid to the tank.

24. A feeder according to claim 23, further comprising a flow-meter that selectively controls flow to a nozzle.

25. The feeder of claim 22, wherein the chemical is in tablet form.

26. The feeder of claim 22, wherein the chemical includes trichloroisocyanurate.

27. The feeder of claim 22, wherein the diversion plate further comprises a non-perforated disc.

28. The feeder of claim 27, wherein the diversion plate further comprises an aperture disposed around a nozzle.

29. The feeder of claim 28, further comprising a flange sealably disposed between the diversion plate and the nozzle preventing the solution from flowing through the aperture.

30. The system of claim 22, further comprising a plurality of spacers disposed between the tank bottom and the diversion plate.

31. The feeder of claim 22, wherein the diversion plate provides for a lengthened downward flow path of the solution past the diversion plate and extended contact between a chemical and a liquid.

32. A feeder for dissolving a chemical and mixing it with a liquid, comprising:
means for dissolving the chemical into the liquid consisting of water to form a solution;
a baffle means for extending contact time;
a solution basin having a bottom for receiving the dissolved solution;
a rinse nozzle disposed at the bottom to direct a portion of the supply of the liquid horizontally across the bottom;
a switch that shuts off the supply of liquid;
a first float disposed in the solution basin that activates the switch to shut off the supply of liquid when the level in the solution basin exceeds a predetermined level;
an outlet from the solution basin disposed relatively above a solution level in the solution basin and the outlet having means for controlling the rate of solution outlet based on the solution level in the solution basin including a valve that opens when the solution level in the solution basin rises and moves toward a closed position when the solution level in the solution basin lowers, wherein the valve does not fully close and a means for suction continually draws the solution up from the outlet valve and out the outlet and wherein an outflow volume varies in response to the position of the outlet valve; and
a second float disposed in the solution basin configured to activate the outlet valve and open the outlet valve as the level in the solution basin rises.

33. The feeder of claim 1, wherein the valve is actuated by a lever arm connected to a float in the solution basin.

* * * * *